United States Patent [19]

Bunas et al.

[11] 4,051,206

[45] Sept. 27, 1977

[54] SIEVE-TYPE FRACTIONATION TRAYS

[75] Inventors: Bennie I. Bunas, Chicago; Kenneth D. Uitti, Bensenville, both of Ill.

[73] Assignee: UOP Inc., Des Plaines, Ill.

[21] Appl. No.: 684,995

[22] Filed: May 10, 1976

[51] Int. Cl.² .............................................. B01F 3/04
[52] U.S. Cl. .................... 261/109; 202/158; 261/114 JP
[58] Field of Search ............. 261/114 JP, 114 TC, 261/114 A, 114 R, 114 VT, 110, 109; 202/158

[56] References Cited

U.S. PATENT DOCUMENTS

| | | | |
|---|---|---|---|
| 2,710,790 | 6/1955 | Rupp et al. | 261/114 VT X |
| 2,718,900 | 9/1955 | Nutter | 261/114 VT X |
| 2,853,281 | 9/1958 | Hibshman et al. | 261/114 JP |
| 2,903,251 | 9/1959 | Thrift | 261/114 JP |
| 2,926,754 | 3/1960 | Ragatz | 261/114 R X |
| 3,282,576 | 11/1966 | Bruckert et al. | 261/114 JP |
| 3,463,464 | 8/1969 | Nutter et al. | 261/114 R |
| 3,700,216 | 10/1972 | Uitti et al. | 261/114 R |
| Re. 27,908 | 1/1974 | Nutter et al. | 261/114 R |

*Primary Examiner*—Tim R. Miles
*Assistant Examiner*—Richard L. Chiesa
*Attorney, Agent, or Firm*—James R. Hoatson, Jr.; Robert W. Erickson; William H. Page, II

[57] ABSTRACT

A sieve-type fractionation tray which has been adjusted for operation at a reduced vapor flow rate. Adjustment is achieved by placing an imperforate plate across the vapor passageways in a manner which selectively seals the passageways located nearest the outlet downcomer. Also a sieve-type fractionation tray having vapor passageways only on the liquid receiving lateral half of the tray.

1 Claim, 2 Drawing Figures

SIEVE-TYPE FRACTIONATION TRAYS

FIELD OF THE INVENTION

The invention relates to an improved design for sieve-type fractionation trays. It therefore presents a gas and liquid contact apparatus similar to those found in Class 261 and more specifically found in Classes 261-100 and 261-114TC.

PRIOR ART

Fractionation is one of the oldest and most widely practiced arts in the petroleum and petrochemical industries. As such, the design of apparatus used in fractionation columns is well known to those skilled in the art and is amply described in the literature. One common type of fractionation tray is referred to as a sieve tray because the vapor passageways through the vapor-liquid contacting area of the tray are formed by a large number of circular perforations which are not covered or sealed by any means, and thus the contacting area resembles a sieve. A description of construction and design factors for sieve trays is found in Chapter 18 of the *Chemical Engineers' Handbook* 4th Ed., 1963, McGraw-Hill Book Co. Sieve-type trays are also described in U.S. Pat. Nos. 3,282,576 (Cl. 261-114) and 3,700,216.

Those skilled in the art are well aware of the problems associated with designing a tray which can operate efficiently over a fairly broad turndown ratio, that is at a reduced feed rate, and therefore at reduced vapor flow rates. At these reduced vapor flow rates the vapor-liquid contacting action is reduced, and the efficiency of the tray suffers greatly. The basic causes of this are referred to as weeping and dumping. Weeping is the passage of some of the liquid through the vapor passageways, and dumping is the condition at which all of the liquid falls through the passageways rather than flowing across the tray. These problems are discussed in U.S. Pat. Re. No. 27,908 (3,463,464). Various pressure responsive valve systems have been developed as a means of avoiding these problems by adjusting the area of the vapor passageways to the vapor flow rate. These systems are not usually preferred if there is a simpler alternative which will give adequate results. The reasons for this include the increased costs to design and build trays using valves, their ability to fail due to accumulated particulate matter or deposits, and increased corrosion problems caused by a greater number of joints and the erosive action of adjacent moving surfaces.

Heretofore, when sieve trays are being adjusted for operation at lower vapor rates the common practice has been to blank-off various sections of the tray by bolting or welding a plurality of imperforate strips to the upper surface of the tray. These strips have been aligned parallel with the direction of liquid flow from the inlet to the outlet downcomers. The prior art methods of blanking off a tray therefore divided the surface of the tray into parallel bands of vapor-liquid contacting area separated by bands in which no vapor-liquid contacting would occur. When it is necessary to blank-off a large percentage of the vapor-liquid contacting area, the prior art method results in liquid being able to traverse the tray with little or no vapor contacting. This is an undesirable effect which reduces tray efficiency.

A second problem in the design of fractionation trays is encountered when the material being fractionated has a marked tendency to form a relatively stable foam. The failure of a foam to break down cause cause the level of the foam to rise to the next tray with the result that liquid is carried up to the next tray. Retention of bubbles in the liquid can cause the bubbles to enter the outlet downcomer with the liquid and thereby be carried to the tray below. This transfer of liquid and vapor is opposite that desired since it reduces the efficiency of the fractionation operation. These problems are referred to respectively as priming and vapor entrainment. Heretofore, trays were designed for a liquid having a tendency to foam by increasing the system limitation factor used to size the column. In general terms this results in a lower vapor velocity through the holes in the tray and through the column and in increased tray spacings.

SUMMARY OF THE INVENTION

The invention provides an improved method of blanking-off sieve trays and also a sieve tray for the use with liquids which tend to create a relatively stable foam. A broad embodiment of a sieve tray which has been blanked-off according to our invention comprises a liquid support plate having liquid receiving and discharging lateral halves, both of which have sieve-type vapor-liquid contacting means, and a substantially flat imperforate plate which rests upon the upper surface of the tray in a manner which seals a desired percentage of the vapor passageways in the tray's liquid support plate, those passageways which are sealed by the plate being only those located closest to the outlet downcomer of the tray. A broad embodiment of the sieve tray for use with foam-forming liquids comprises a liquid support plate having liquid receiving and discharging lateral halves, the discharging lateral half being completely free of any vapor-liquid contacting means and with the receiving lateral half having vapor passageways with an open area equal to from 2 to 20 percent of the area of the tray.

DESCRIPTION OF THE DRAWING

Referring now to FIG. 1, there is shown the cylindrical wall 1 of a distillation column, the internal volume of which is traversed by an upper liquid support plate 2 and a lower liquid support plate 2'. A large number of cylindrical perforations 3 are provided on the receiving lateral half of each liquid support plate to enable the structure to operate as a sieve tray. The discharging larteral half of the support plate is not perforated. Liquid is guided to the upper tray by an inlet downcomer wall 4 and is removed from this tray through the outlet downcomer formed by vertical wall 5. The liquid support plates rest on an L-shaped lip 6 attached to the inner surface of the column wall. Several structural supports 7 are extended across the internal volume of the column to prevent the support plate from sagging in its central areas. In FIG. 2 a liquid support plate 12 is shown suspended across the internal volume of a fractionation column enclosed by a cylindrical outer wall 9. Entering liquid descends from above through a chordal downcomer located between vertical wall 10 and the inner surface of wall 9. This liquid flows onto the receiving lateral half of the tray and then travels to the upper end of the outlet downcomer formed by vertical wall 11. A large number of perforations 13 are present on both lateral halves of the support plate as in the prior art method of sieve tray construction. The tray has been adjusted or modified for operation at reduced vapor rates by the provision of a substantially flat imperforate plate 14 which has been laid across the upper surface of the support plate in a manner which seals a desired percentage of the perforations. In accordance with the preferred embodiment of our method, those perforations which are located closest to the inlet downcomer have not been sealed.

DETAILED DESCRIPTION

Figure 2:
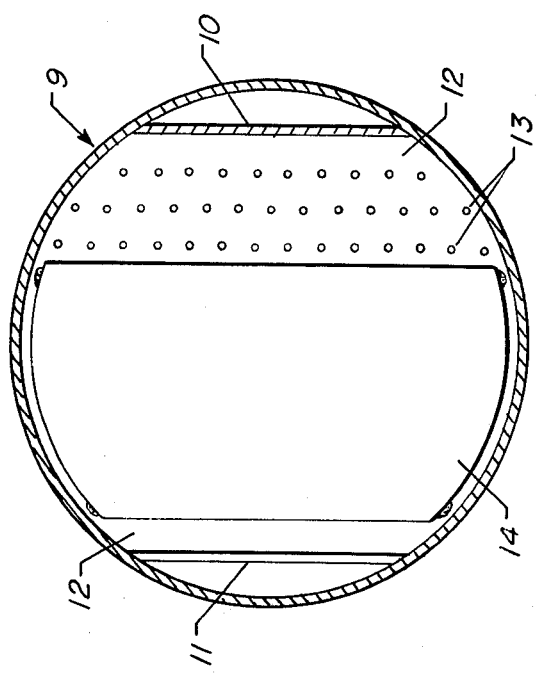
FIG. 2 is a view looking downward toward a sieve-type tray which has been blanked-off in accordance with our preferred embodiment. These illustrations and the following descriptions are not intended to limit the scope of the invention or to bar its adaptation to specific usages or structures not set out herein.

Sieve type fractionation trays are used in the fractionation of a great many petroleum products and petrochemicals. The basic element of a sieve tray is a substantially flat liquid support plate with a large number of circular perforations punched through it. The support plate may be fabricated from several interlocking panels or may be single circular plate which has been trimmed to provide a space for an outlet downcomer. The tray will be held in a horizontal position across the internal volume of the fractionation column by a rim or lip attached to the inner surface of the column. In addition, the relatively thin liquid support plate will be supported by a number of structural members which extend across the inside of the column to prevent the support plate from sagging and thereby prevent uneven liquid loading and poor vapor-liquid contacting. The tray is adapted to retain a body of liquid on its upper surface by the provision of a weir at the inlet of the outlet downcomer, the use of close fitting seals at the periphery of the tray and any intermediate joints, and a limitation of the number of perforations in the vapor-liquid contacting area of the tray.

The vapor-liquid contacting means employed on a sieve tray are cicular openings which are sized and spaced in accordance with relationships known to those skilled in the art. Typical sieve tray perforations are from $\frac{1}{8}$ to $\frac{1}{2}$-inch in diameter and are spaced from 1 to 4 inches apart in rows which extend across the tray parallel to the downcomers. The basic factors which determine the number of the perforations and the size of the tray are the volume of vapor which is expected to pass upward through the tray and the percentage of a tray's area which is punched out to provide the perforations. This latter factor is referred to herein as the open area of the tray and usually ranges from about 2 to 20% of the surface of the tray. The surface area of the tray is considered to be the internal cross section of the column minus the area devoted to use as the outlet downcomer.

For purposes of description the tray is divided into a liquid receiving lateral half and a liquid discharging lateral half. The receiving lateral half includes the side of the tray having the inlet downcomer, and it is divided from the discharging lateral half along a line which is perpendicular to the flow of liquid between the centers of the two downcomers. It is perferred that both downcomers are of the chordal type and are formed by planar vertical walls. These walls should extend downward from a preselected distance above the surface of the tray equal to the height of the weir desired at the inlet of the downcomer to a point below the top of the weir of the next lower tray. This is similar to the structure shown in FIG. 1.

In the normal prior art tray vapor passageways were placed in equal numbers on both lateral halves of the tray. It is often necessary to blank-off some of these perforations to adjust the column for effective operation at lowered vapor rates. This may be to adapt an existing column to a new usage as part of a process revamping or where used equipment is being salvaged for completely different operation. Furthermore, columns must be sized according to the maximum expected throughput of the feed stream, but new operations are sometimes initially placed onstream at lower feed stream rates. It is therefore necessary to adjust the open areas of the tray by blanking-off sections of the tray's surface. This maintains the desired vapor velocity through the remaining unsealed vapor passageways, and thereby keeps the tray's efficiency at its prior level. The amount of original open area which is blanked-off may range from 15 to about 80 percent.

If it was desired to blank-off 80% of the surface of the tray, the prior art method was to place eight-inch wide strips across the tray with a two-inch space between them. The strips were laid parallel to a line drawn between the centers of the downcomers. This results in good vapor-liquid contacting along the narrow uncovered spaces and no contacting on the wider blanked-off spaces. Some mixing of the liquid occurs on the tray and will tend to balance these two extremes, but the result is still probably a reduction in tray efficiency. Our invention resides in a different placement of the imperforate plates used to blank-off the tray. More precisely, the plates are orientated perpendicular to a straight line connecting the centers of the downcomers and selectively cover those perforations in the tray which are located furthest from the inlet downcomer. That is, if it is desired to blank-off 40% of the tray's open area, then only vapor passageways on the discharging lateral half of the tray would be sealed. The embodiment shown in FIG. 2 illustrates this preferential sealing arrangement.

It is readily apparent that a tray can be blanked-off in accordance with our invention by a plurality of plates of varying sizes and shapes or by a single plate as illustrated in the drawing. If a plurality of plates is used, the individual plates may be orientated in any direction but should selectively seal only the vapor passageways which are closest to the outlet downcomer. These differing arrangements are referred to herein as a substantially flat imperforate sealing means. Its overall shape, when viewed from above, is a circular plate having a radius slightly less than that of the periphery of the tray and from which sections have been removed along two opposing parallel chords. One section is for the outlet downcomer and the other leaves exposed the desired free area of the tray. The sealing means will preferably cover at least 25 percent of the vapor passageways located in the discharging lateral half of the tray. It may be bolted down or tack welded to the upper surface of the tray. The plate or plates used as the sealing means are preferably $\frac{1}{8}$- to $\frac{1}{4}$-inch steel having the same alloy composition as the liquid support plate of the tray, and it is preferred that a single unitary plate is used. However, the limitations placed on the size of structural elements which can be transferred into or out of a column by the available openings in the column's outer wall may require the sealing means to be made from several pieces assembled within the column.

In accordance with this description a sieve-type fractionation tray which has been blanked-off according to our preferred embodiment comprises a liquid support plate having a horizontal upper surface and adapted to be mounted horizontally in a fractionation column and to retain a body of liquid thereon, said liquid support plate being divided into a receiving lateral half and a discharging lateral half which is adjacent a chordal outlet downcomer, said discharging lateral half and said receiving lateral half of said liquid support plate having sieve-type vapor passageways located thereon, with said sieve-type vapor passageways having a total open area equal to from 2 to 20 percent of said upper horizontal surface, and a horizontal flat imperforate sealing means which rests upon said upper horizontal surface in a manner which covers and seals at least 25 percent of said sieve-type vapor passageways located on said discharging lateral half of said liquid support plate and which leaves unsealed those sieve-type passageways located furthest from said chordal outlet downcomer.

Certain liquids, notably glycols, amines and particulate-containing crude oils and reduced crudes, have a marked tendency to form a relatively stable foam which persists for a definite time after exposure to the vapor passing through the tray has terminated. These materials therefore are especially subject to the problems of vapor entainment and priming which were previously described. Foam is distinguished from froth which is desired on the tray by the characteristic tendency of froth to collapse soon after it leaves contact with vapor bubbling through the liquid.

Figure 1:
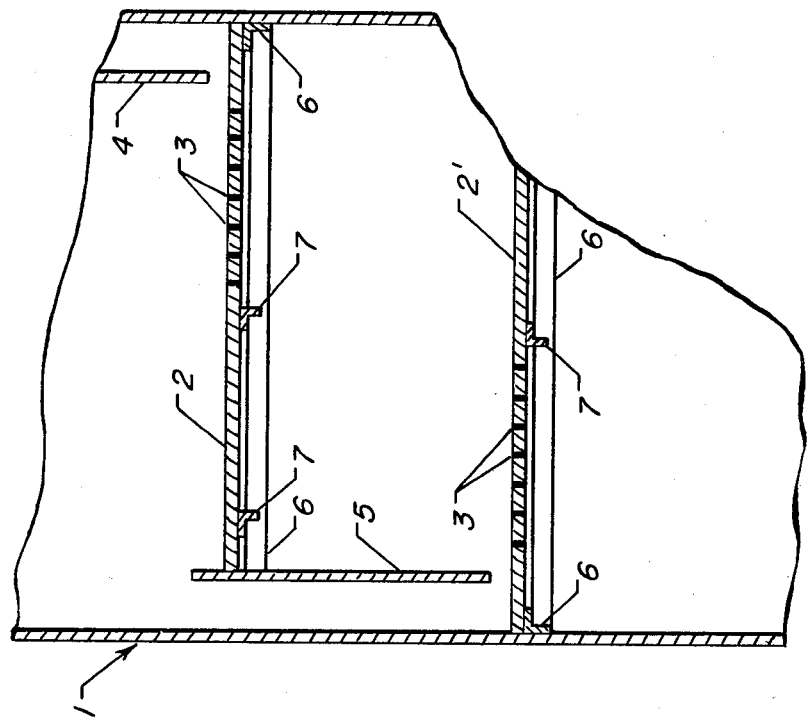
FIG. 1 illustrates a sieve-type fractionation tray which is intended for use with foam-forming liquids.

A fractionation tray constructed in a manner similar to FIG. 1 provides a much greater time for foam to break down than a prior art sieve tray having vapor passageways uniformly spaced across its upper surface. This is because the discharging lateral half of the tray acts as a settling area in which the material on the tray is not subjected to vapor-liquid contacting. In this embodiment of our invention 2 to 20 percent of the tray is allotted to open area for vapor passage as in the prior art, but all vapor passageways are located on the receiving lateral half of the tray. This structural limitation may also be expressed by defining the discharging lateral half as imperforate and devoid of any vapor passageways. In all other respects the tray will be built in accordance with the previous discussion and the well known methods of the prior art. Although it is preferred that all of the vapor passageways are located on the receiving lateral half of the tray, the same benefits may be obtained by any tendency to concentrate the vapor passageways on the receiving lateral half. Therefore trays with an imperforate settling area as small as 25% of the surface area of the tray should function in a similar manner.

We claim as our invention:

1. A sieve-type fractionation tray which comprises a liquid support plate having a horizontal upper surface and adapted to be mounted horizontally in a fractionation column and to retain a body of liquid thereon, said liquid support plate being divided into a receiving lateral half and a discharging lateral half which is adjacent a chordal outlet downcomer, said discharging interal half and said receiving lateral half of said liquid support plate having sieve-type vapor passageways located thereon, said sieve-type vapor passageways having a total open area equal to from 2 to 20 percent of said upper horizontal surface, and a flat imperforate sealing plate which rests upon said upper horizontal surface in a manner which covers and seals all said sieve-type vapor passageways located on said discharging lateral half of said liquid support plate and which leaves unsealed those sieve-type vapor passageways located on said receiving lateral half of said liquid support plate.

* * * * *